US006447259B2

(12) United States Patent
Elliott-Moore

(10) Patent No.: US 6,447,259 B2
(45) Date of Patent: Sep. 10, 2002

(54) PRESSURE ENERGY RECOVERY DEVICE

(75) Inventor: Peter Elliott-Moore, Evesham (GB)

(73) Assignee: Calder Limited, Worcestershire (GB)

( * ) Notice: Subject to any disclaimer, the term of this patent is extended or adjusted under 35 U.S.C. 154(b) by 0 days.

(21) Appl. No.: 09/727,676

(22) Filed: Dec. 4, 2000

(30) Foreign Application Priority Data

Dec. 15, 1999 (GB) .............................................. 9929508

(51) Int. Cl.[7] .............................................. F04B 35/00
(52) U.S. Cl. ...................... 417/225; 417/226; 417/393; 417/399; 417/531; 417/532; 417/401
(58) Field of Search ................................ 417/225, 226, 417/393, 401, 531, 532; 210/85–808; 62/1–940

(56) References Cited

U.S. PATENT DOCUMENTS

| 3,558,242 | A | * | 1/1971 | Jenkyn-Thomas | 417/374 |
|---|---|---|---|---|---|
| 3,791,768 | A | * | 2/1974 | Wanner | 417/393 |
| 4,019,838 | A | * | 4/1977 | Fluck | 417/393 |
| 4,367,140 | A | * | 1/1983 | Wilson | 210/110 |
| 4,432,876 | A | * | 2/1984 | Keefer | 210/652 |
| 4,627,794 | A | * | 12/1986 | Silva | 417/225 |
| 4,637,783 | A | * | 1/1987 | Andeen | 417/318 |
| 4,820,136 | A | * | 4/1989 | Saurwein | 417/397 |
| 4,913,809 | A | | 4/1990 | Sawada et al. | |
| 5,154,820 | A | * | 10/1992 | Solomon | 210/134 |
| 5,462,414 | A | | 10/1995 | Permar | |
| 5,500,113 | A | * | 3/1996 | Hartley et al. | 210/321.6 |
| 5,628,198 | A | | 5/1997 | Permar | |

FOREIGN PATENT DOCUMENTS

| EP | 0 028 931 | 5/1981 |
|---|---|---|
| EP | 0 104 847 | 4/1984 |
| EP | 0 181 756 | 5/1986 |
| EP | 0 365 805 | 5/1990 |
| GB | 2 088 968 | 6/1982 |
| GB | 2 319 570 | 5/1998 |
| GB | 2 333 564 | 7/1999 |

* cited by examiner

Primary Examiner—Charles G. Freay
Assistant Examiner—John F Belena
(74) Attorney, Agent, or Firm—Young & Thompson

(57) ABSTRACT

An energy recovery device includes at least one cylinder, a piston slidable in the cylinder, a first valve for selectively connecting one end of the cylinder to waste liquid at a first relatively high pressure and to drain and a second valve for allowing feed liquid to enter the other end of the cylinder at a second lower pressure via a feed liquid entry port and to be discharged via a feed liquid discharge port from the other end of the cylinder in response to movement of the piston caused by waste liquid entering the one end of the cylinder. A rod which extends from the other end of the cylinder and into but not through the piston, ensures that the area of the piston acting on the feed liquid is less than the area of the piston acted upon by the waste liquid so that the piston acts as a pressure intensifier to discharge feed liquid through the feed liquid discharge port at a higher pressure than the pressure of waste liquid entering the one end of the cylinder.

17 Claims, 4 Drawing Sheets

PRESSURE ENERGY RECOVERY DEVICE

BACKGROUND OF THE INVENTION

This invention relates to an energy recovery device particularly but not exclusively for use in combination with reverse osmosis equipment such as is used, for example, in the desalination of water.

Desalination plants are required to operate at the highest possible efficiency in order to keep the cost of water to a minimum. It is well known to employ energy recovery devices to recover energy from the waste liquor of reverse osmosis equipment. There are various known devices for recovering energy by changing the pressure energy of the waste liquor to shaft work, such as turbines, Pelton wheels and reverse running pumps. However, the conversion of fluid pressure to shaft work and then back again to fluid pressure is inherently less efficient than using fluid pressure directly.

It is also known, such as from U.S. Pat. No. 5,306,428, to use work exchangers to transfer the fluid pressure of the waste liquor across a piston. However, there is a pressure drop across the reverse osmosis equipment and known recovery systems employing a piston to transfer the pressure of the waste liquor to feed liquid require the use of a booster pump to raise the pressure of the liquid exiting from the work exchanger to the inlet pressure of the reverse osmosis equipment.

SUMMARY OF THE INVENTION

According to a first aspect of the present invention there is provided an energy recovery device comprising at least one cylinder, a piston slidable in the cylinder, first valve means for selectively connecting one end of the cylinder to waste liquid at a first relatively high pressure and to drain, second valve means for allowing feed liquid to enter the other end of the cylinder at a second lower pressure via a feed liquid entry port and to be discharged via a feed liquid discharge port from the other end of the cylinder in response to movement of the piston caused by waste liquid entering said one end of the cylinder, and means ensuring that the area of the piston acting, in use, on the feed liquid is less than the area of the piston, in use, acted upon by the waste liquid so that the piston acts as a pressure intensifier to discharge feed liquid through the feed liquid discharge port at a higher pressure than the pressure of waste liquid entering said one end of the cylinder.

According to a second aspect of the invention, there is provided an energy recovery device comprising a valve housing, a slidable valve element in the valve housing and two cylinders extending from the valve housing in a direction transverse to the axis of movement of the valve element, the slidable valve element controlling the flow of liquid to and from both cylinders.

According to a third aspect of the invention there is provided an energy recovery device according to the first or the second aspect of the invention in combination with reverse osmosis equipment.

The invention will now be more particularly described, by way of example, with reference to the accompanying drawings.

DESCRIPTION OF THE PREFERRED EMBODIMENTS

Figure 1:
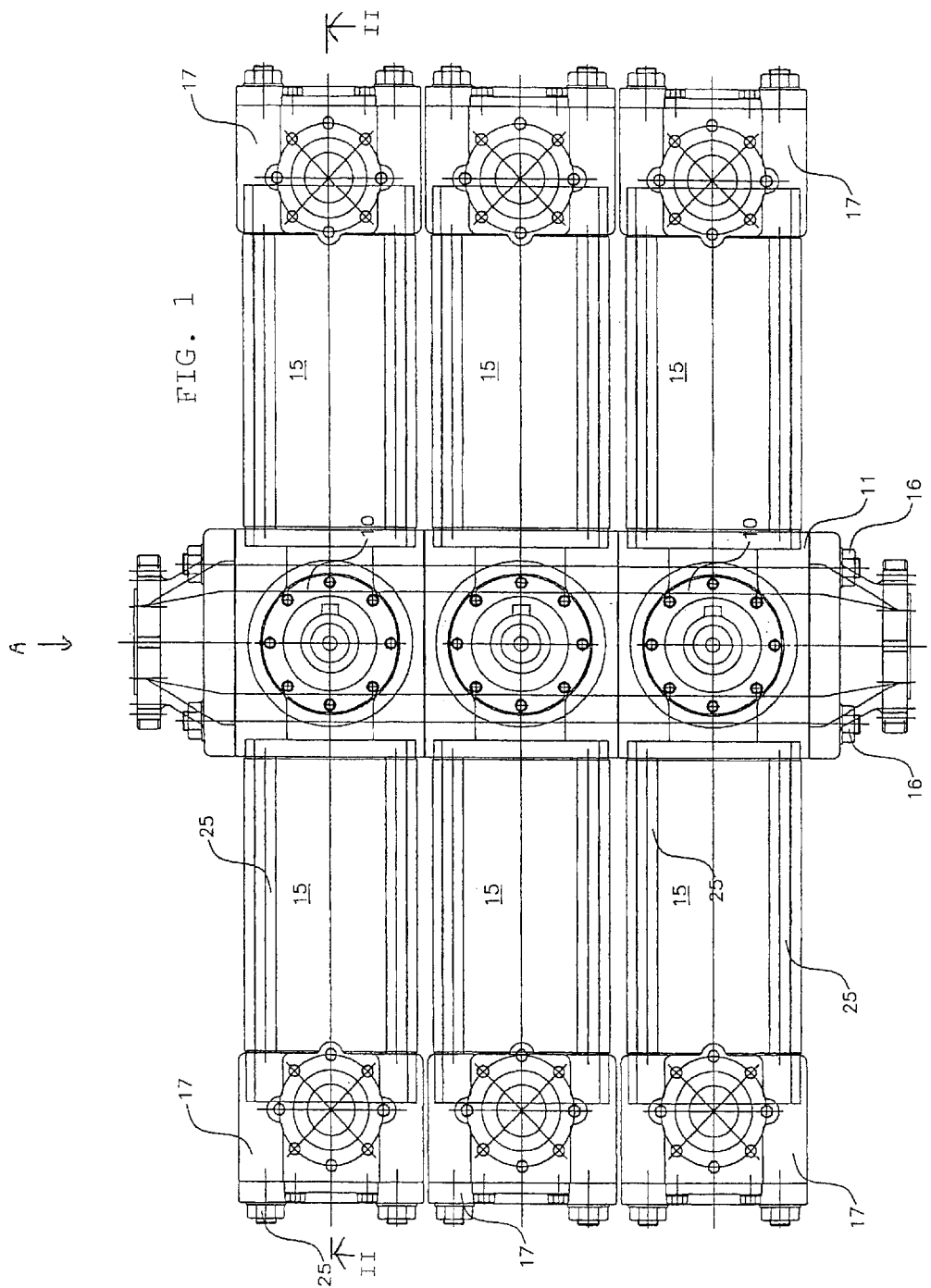
FIG. 1 is a plan view of one embodiment of an energy recovery device according to the present invention.

Referring to the drawings, there is shown therein an energy recovery device comprising three spool valves 10 each having a housing 11 provided with an inlet port 12 which is connected, in use, to a supply of waste liquid discharged from reverse osmosis equipment used, for example, in the desalination of water and an outlet port 13 connected to drain. Each spool valve 10 also comprises a linear drive unit 14 for driving a slidable valve element 9 to be described hereinafter. The three spool valves 10 are fixed together in side by side relationship by threaded rods 16 extending through the housings 11.

The energy recovery device also comprises two banks of cylinders 15. Each bank comprises three cylinders 15, the cylinders of one bank extending from one side of a respective housing 11 in a direction perpendicular to the axis of movement of the linear drive units 14 and the cylinders of the other bank extending from the other side of a respective housing 11 in an opposite direction.

Each cylinder 15 has a port block 17 at its end remote from its respective spool valve 10. Each port block 17 has a feed liquid entry port 18 and a feed liquid discharge port 19.

Figure 2:
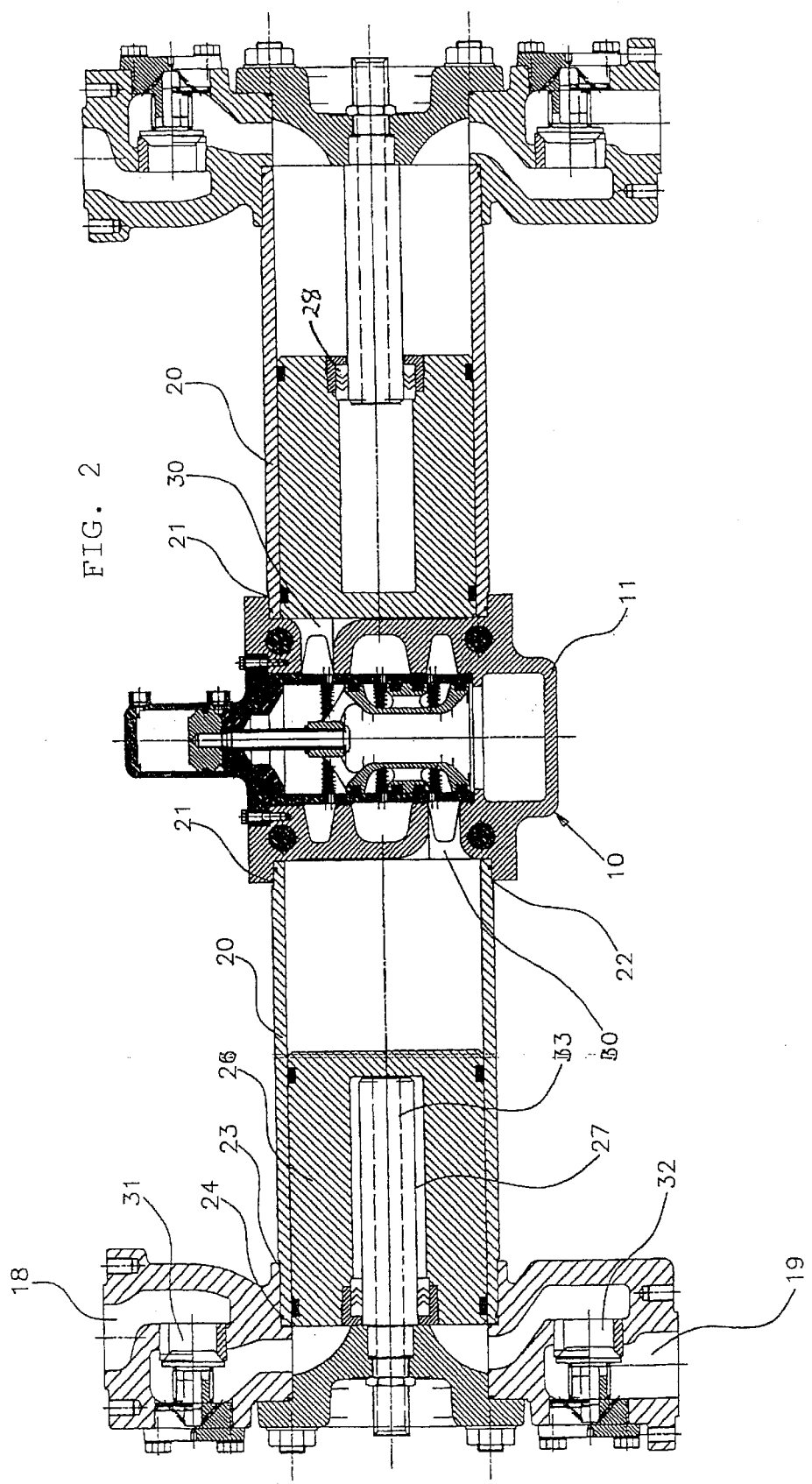
FIG. 2 is a section taking along line II—II of FIG. 1.
Figure 3:
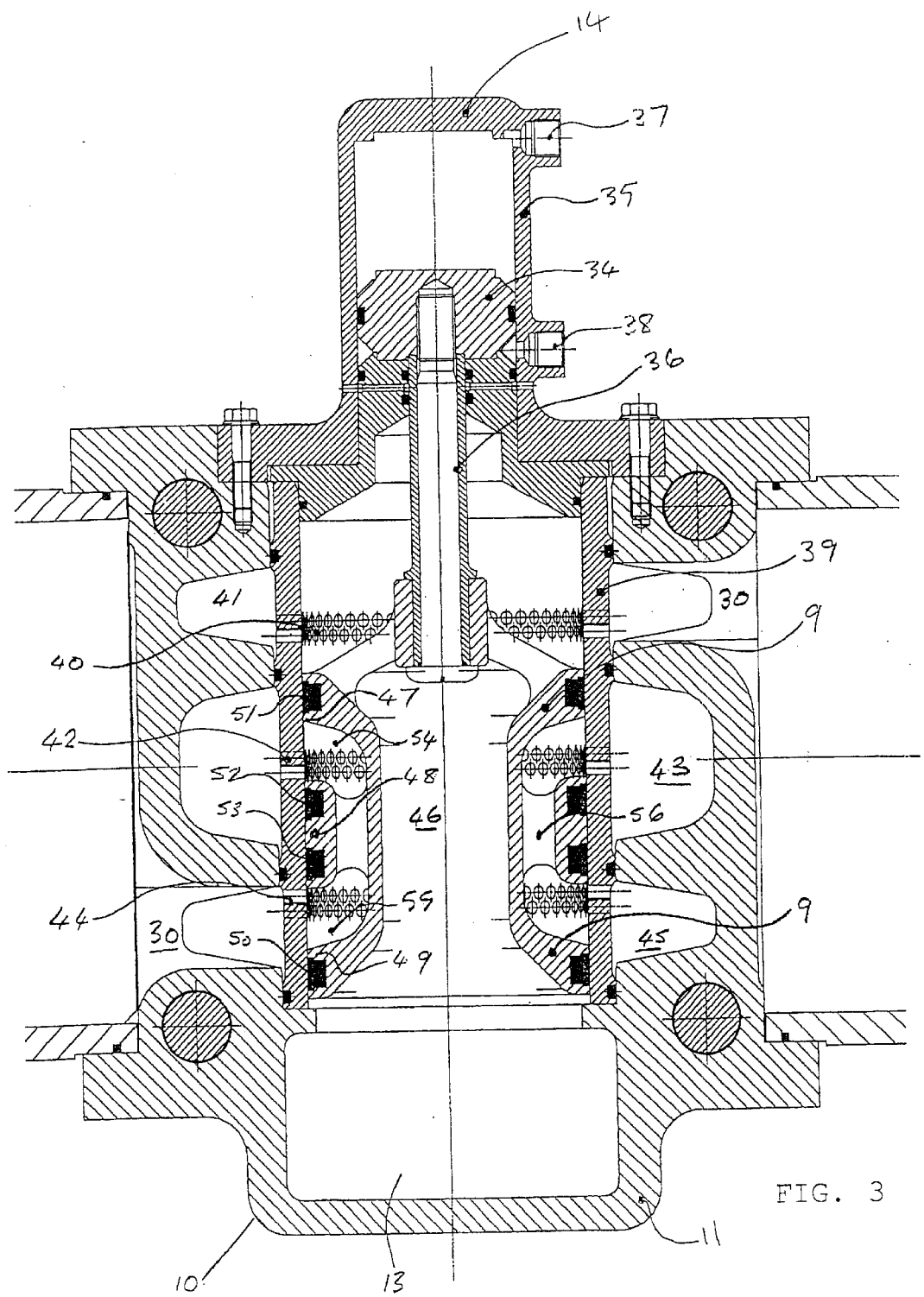
FIG. 3 is a fragmentary enlarged section of part of the energy recovery device shown in FIG. 2.
Figure 4:
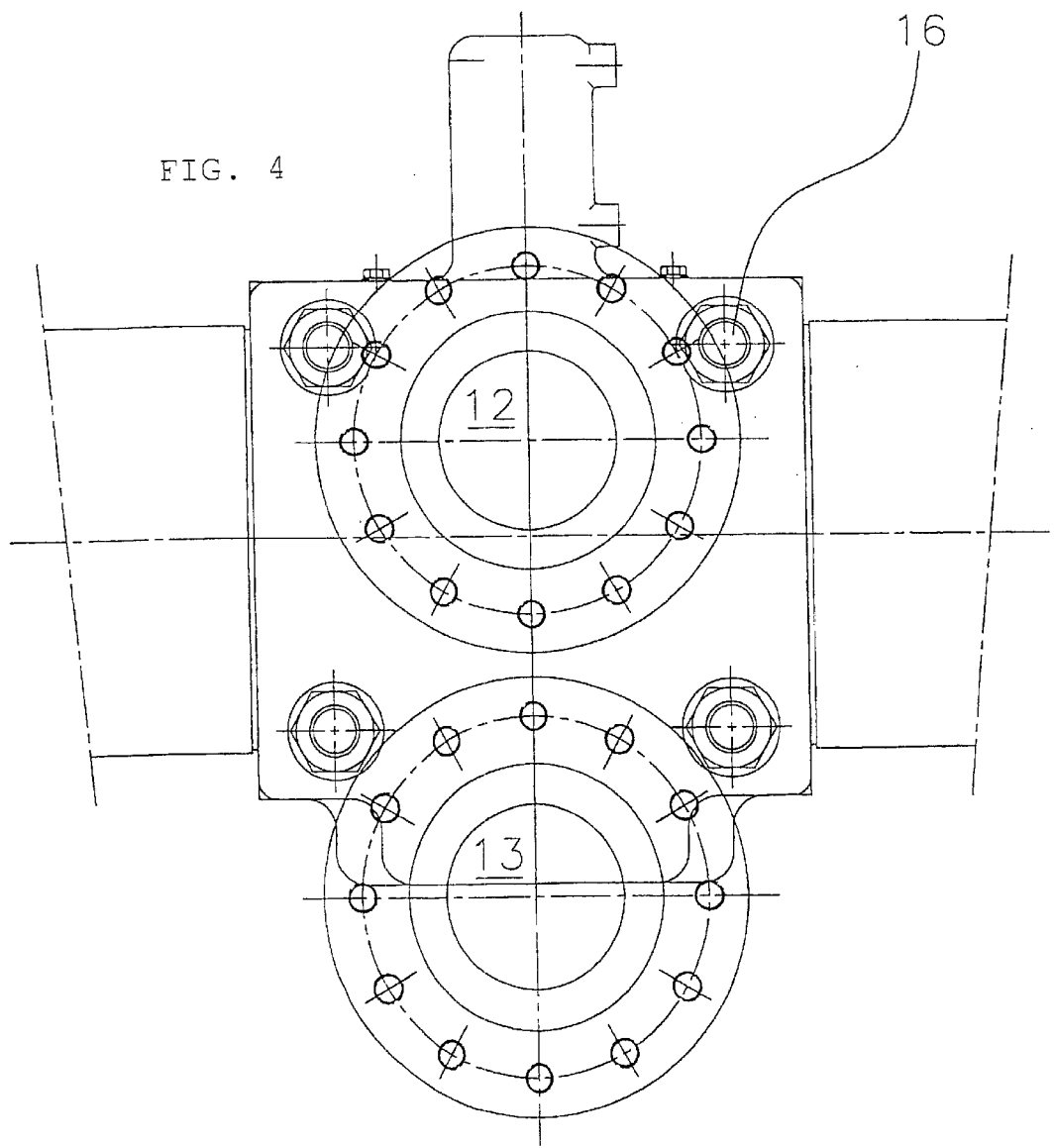
FIG. 4 is an enlarged fragmentary view in the direction of arrow A in FIG. 1.

As best shown in FIG. 2 of the drawings, each cylinder 15 comprises a tubular shell 20 mounted in a recess 21 of a respective housing 11. An O-ring seal 22 is provided in a groove in the shell 20 and forms a seal between the housing 11 and the shell 20. The other end of each shell 20 is mounted in a recess 23 in a respective port block 17. A further O-ring seal 24 is provided in a groove in the shell 20 and provides a seal between the port block 17 and the shell 20. Tie rods 25 (see FIG. 1) extend between each valve housing 11 and each port block 17 in order to clamp each shell 20 between a respective housing 11 and a respective port block 17.

Each cylinder 15 contains a hollow piston 26. The end of the piston 26 adjacent to the valve housing 11 is closed, but the other end has an opening which receives a fixed rod 27 extending from the centre of the port block 17. The piston 26 is slidable on the rod 27 and a seal 28 is provided between the piston 26 and the rod 27 to prevent flow of liquid between the interior of the hollow piston 26 and the annular space between the rod 27 and the shell 20.

Each housing 11 has a waste liquid inlet/outlet port 30.

Each port block 17 has a first non-return valve 31 for preventing feed liquid flowing from the cylinder through the feed liquid entry port 18 and a second non-return valve 32 for preventing liquid entering the cylinder through the feed liquid discharge port 19. The interior of the piston 26 communicates with the feed liquid entry port 18 via a through bore 33 in the rod 27.

The linear drive unit 14 of each spool valve 10 comprises a piston 34 and a cylinder 35. The piston 34 is connected to the slidable valve element 9 by a rod 36 and the cylinder has two air ports 37 and 38. The slidable valve element 9 is slidable in a sleeve 39 contained within the housing 11. The sleeve 39 has a first annular array of openings 40 which communicate with an annular groove 41 in the housing 11 and this annular groove communicates with the liquid inlet/ outlet port 30 of the right hand cylinder, as shown in FIG. 2. The sleeve has a second annular array of openings 42. These openings 42 communicate with an annular groove 43 of the housing 11. The annular groove 43 communicates with the inlet port 12. The sleeve also has a third annular array of openings 44. The openings 44 communicate with an annular groove 45 of the housing 11. This annular groove 45 communicates with the waste liquid inlet/outlet port 30 of the left hand cylinder, as shown in FIG. 2.

The valve element 9 has a through bore 46 which is connected to the outlet port 13 of the spool valve 10. It also has three lands 47, 48 and 49. The lands 47 and 49 are at opposite ends of the valve element 9 and each have a single annular seal 51 and 50, respectively. The central land 48 has two axially spaced seals 52 and 53.

A first annular groove 54 is defined between the lands 47 and 48 and a second annular groove 55 is defined between the lands 48 and 49. These grooves are in fluid communication with one another via passages 56 in the land 48. As shown, the annular groove 54 communicates with the second annular array of openings 42 in the sleeve 39 and the second annular groove 55 communicates with the third annular array of grooves 44 in the sleeve 39. This places the left hand cylinder 15 in communication with the inlet port 12 and waste liquid discharged from the reverse osmosis equipment flows into the left hand cylinder 15 and moves the piston 26 towards its respective port block 17 to discharge feed liquid from the cylinder through the feed liquid discharge port 19. The rod 27 ensures that the area of the piston 26 acting on the feed liquid is less than the area of the piston acted upon by the waste liquid so that the piston acts as a pressure intensifier to discharge feed liquid through the feed liquid discharge port 19 at a higher pressure than the pressure of waste liquid entering the other end of the cylinder. The feed liquid can therefore be fed to the reverse osmosis equipment without the need for a booster pump. Also, as shown, the first annular array of openings 40 communicates with the through bore of the valve element 9 and thus with the outlet port 13. This enables feed liquid to enter the feed liquid entry port 18 of the right hand cylinder 15 and discharge waste liquid from the right hand cylinder 15 to drain via the outlet port 13.

Air is then admitted to the cylinder 35 through the port 38 while port 37 is vented to atmosphere. This moves the piston 34 upwards and moves the valve element 9 to a position in which the right hand cylinder 15 is connected to a supply of waste liquid discharged from the reverse osmosis equipment and in which the left hand cylinder 15 is connected to drain.

The seals 52 and 53 on the central land 48 of the valve element 9 cut off the supply of waste liquid to the annular grooves 54 and 55 while seals 50 and 51 move across respective annular arrays of apertures 40 and 44. This protects the seals 50 and 51 from damage.

The timing of the operation of the energy recovery device can be varied by controlling the supply of air to the pistons 34.

The length of each cylinder 15 is, preferably, no greater than 1.5 meters and is, typically, one meter in length. This is much shorter than the cylinders of conventional work exchanges used to transfer fluid pressure of the waste liquid across a piston.

The embodiment described above is given by way of example only and various modifications will be apparent to one skilled in the art without departing from the scope of the invention as defined in the appended claims. For example, the rod 27 may be fixed relative to the piston and may be slidable relative to the end of the cylinder remote from the spool valve housing 11. Alternatively, instead of the rod, the cylinder could have a stepped diameter bore receiving a stepped diameter piston.

What is claimed is:

1. An energy recovery device comprising:
   at least one pair of cylinders;
   a piston slidable in each of the at least one pair of cylinders;
   a spool valve having a valve housing and a slidable valve element for controlling the flow of waste liquid to and from the at least one pair of cylinders, said spool valve selectively connecting one end of one of the at least one pair of cylinders to waste liquid at a first relatively high pressure and connecting another one of the at least one pair of cylinders to drain and vice versa;
   first and second valves for allowing feed liquid to enter the other end of said one of the at least one pair of cylinders at a second lower pressure via a feed liquid entry port and to be discharged via a feed liquid discharge port from said other end of said one of the at least one pair of cylinders in response to movement of the piston caused by waste liquid entering said one end of said one of the at least one pair of cylinders; and
   means ensuring that the area of the piston acting, in use, on the feed liquid is less than the area of the piston, in use, acted upon by the waste liquid so that the piston acts as a pressure intensifier to discharge feed liquid through the feed liquid discharge port at a higher pressure than the pressure of waste liquid entering said one end of said one of the at least one pair of cylinders,
   wherein said one of the at least one pair of cylinders extends from the spool valve in a first direction transverse to the axis of movement of the valve element and the other one of the at least one pair of cylinders extends from the valve housing in a second direction transverse to the axis of movement of the valve element.

2. An energy recovery device as claimed in claim 1, wherein said means comprises a rod extending between said other end of said one of the at least one pair of cylinders and the piston, the rod being slidable relative to said other end of said one of the at least one pair of cylinders or extending into but not through the piston so that the piston is slidable on the rod.

3. An energy recovery device as claimed in claim 2, wherein the rod is fixed and extends from said other end of said one of the at least one pair of cylinders and into but not through the piston.

4. An energy recovery device as claimed in claim 1, wherein the first and second valves are non-return valves.

5. An energy recovery device as claimed in claim 4, comprising a first non-return valve for preventing feed liquid flowing from the at least one pair of cylinders through the feed liquid entry port and a second non-return valve for preventing liquid entering the at least one pair of cylinders through the feed liquid discharge port.

6. An energy recovery system as claimed in claim 5, wherein the first and second non-return valves are in the feed liquid entry port and the feed liquid discharge port, respectively.

7. An energy recovery device as claimed in claim 1, wherein the first and second directions are opposite to one another.

8. An energy recovery device comprising:
   at least one cylinder;

a piston slidable in the at least one cylinder;

a spool valve having a valve housing and a slidable valve element for controlling the flow of waste liquid to and from the at least one cylinder, said spool valve selectively connecting one end of the at least one cylinder to waste liquid at a first relatively high pressure and to drain and vice versa;

first and second valves for allowing feed liquid to enter the other end of the at least one cylinder at a second lower pressure via a feed liquid entry port and to be discharged via a feed liquid discharge port from said other end of the at least one cylinder in response to movement of the piston caused by waste liquid entering said one end of the at least one cylinder; and means ensuring that the area of the piston acting, in use, on the feed liquid is less than the area of the piston, in use, acted upon by the waste liquid so that the piston acts as a pressure intensifier to discharge feed liquid through the feed liquid discharge port at a higher pressure than the pressure of waste liquid entering said one end of the at least one cylinder, wherein the slidable valve element has two axially spaced annular grooves and a land therebetween, the two grooves being in fluid communication with one another by a passage in the land and the land having two axially spaced apart annular seals for cutting off the supply of waste liquid to the grooves while the slidable valve element moves from a position in which the grooves are in full fluid communication with said one end of the at least one cylinder and a position in which the grooves are out of fluid communication with said one end of the at least one cylinder and vice versa.

9. An energy recovery device as claimed in claim 8, wherein said means comprises a rod extending between said other end of the at least one cylinder and the piston, the rod being slidable relative to said other end of the at least one cylinder or extending into but not through the piston so that the piston is slidable on the rod.

10. An energy recovery device as claimed in claim 9, wherein the rod is fixed and extends from one end of the at least one cylinder and into but not through the piston.

11. An energy recovery device as claimed in claim 8, wherein the first and second valves are non-return valves.

12. An energy recovery device as claimed in claim 11, comprising a first non-return valve for preventing feed liquid flowing from the at least one cylinder through the feed liquid entry port and a second non-return valve for preventing liquid entering the at least one cylinder through the feed liquid discharge port.

13. An energy recovery device as claimed in claim 12, wherein the first and second non-return valves are in the feed liquid entry port and the feed liquid discharge port, respectively.

14. An energy recovery device in combination with reverse osmosis equipment, the energy recovery device comprising:

at least one cylinder;

a piston slidable in the at least one cylinder;

a spool having a valve housing and a slidable valve element for controlling the flow of waste liquid to and from the at least one cylinder, said spool valve selectively connecting one end of the at least one cylinder to waste liquid at a first relatively high pressure and to drain and vice versa;

a valve means for allowing feed liquid to enter the other end of the at least one cylinder at a second lower pressure via a feed liquid entry port and to be discharged via a feed liquid discharge port from said other end of the at least one cylinder in response to movement of the piston caused by waste liquid entering said one end of the at least one cylinder; and means ensuring that the area of the piston acting, in use, on the feed liquid is less than the area of the piston, in use, acted upon by the waste liquid so that the piston acts as a pressure intensifier to discharge feed liquid through the feed liquid discharge port at a higher pressure than the pressure of waste liquid entering said one end of the at least one cylinder, wherein the slidable valve element has two axially spaced annular grooves and a land therebetween, the two grooves being in fluid communication with one another by passage means in the land and the land having two axially spaced apart annular seals for cutting off the supply of waste liquid to the grooves while the slidable valve element moves from a position in which the grooves are in full fluid communication with said one end of the at least one cylinder and a position in which the grooves are out of fluid communication with said one end of the at least one cylinder and vice versa.

15. The energy recovery device as claimed in claim 14, comprising at least one pair of cylinders, said spool valve controlling the flow of liquid to and form said at least one pair of cylinders.

16. The energy recovery device as claimed in claim 15, wherein the spool valve is structured and arranged to connect one of said at least one pair of cylinders to waste liquid and connect another of said at least one pair of cylinders to drain and vice versa.

17. The energy recovery device as claimed in claim 16, wherein said one of said at least one pair of cylinders extends from the spool valve in a first direction transverse to the axis of movement of the valve element and the other one of the at least one pair of cylinders extends from the valve housing in a second direction transverse to the axis of movement of the valve element.

* * * * *